United States Patent Office 3,321,049
Patented May 23, 1967

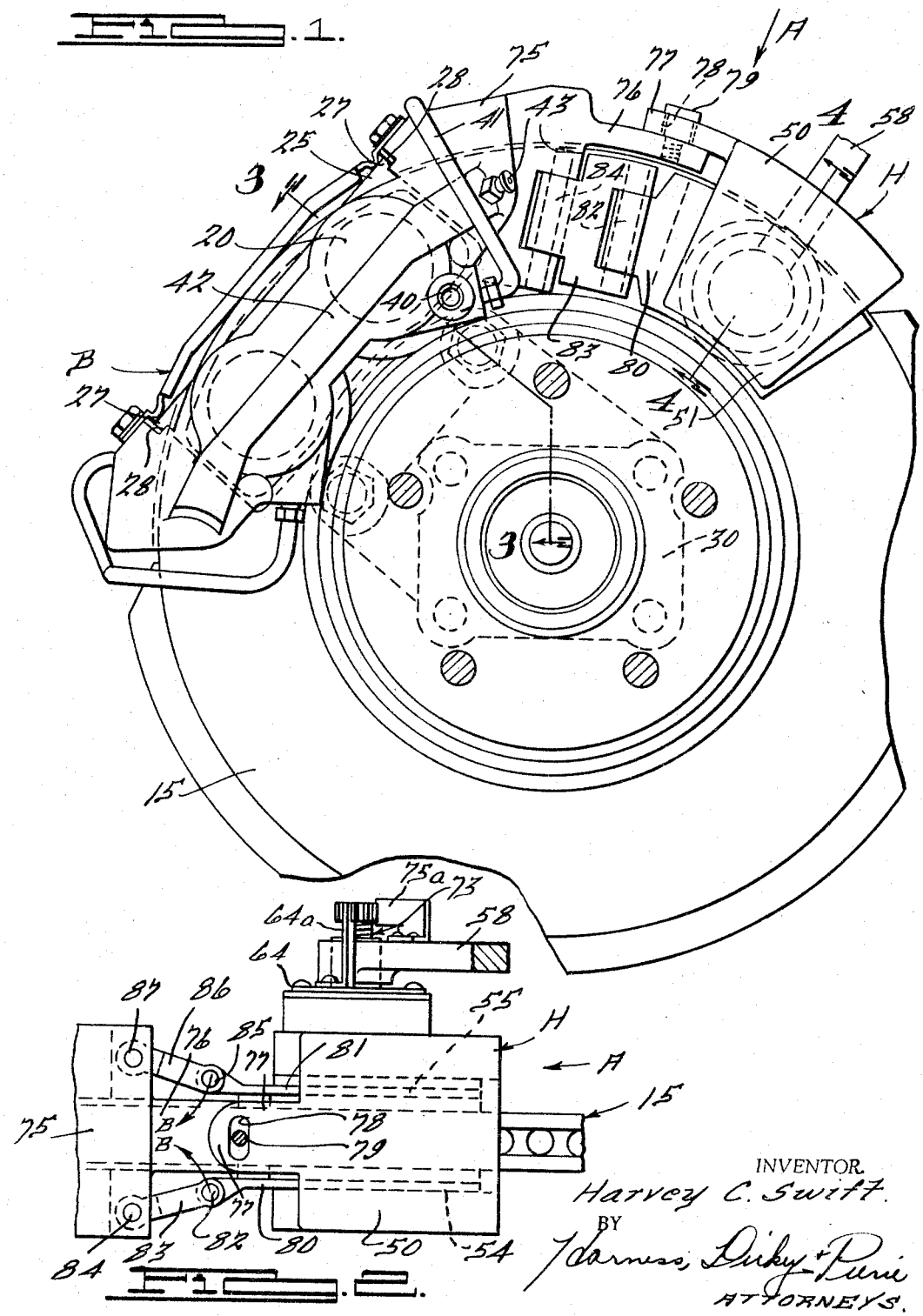

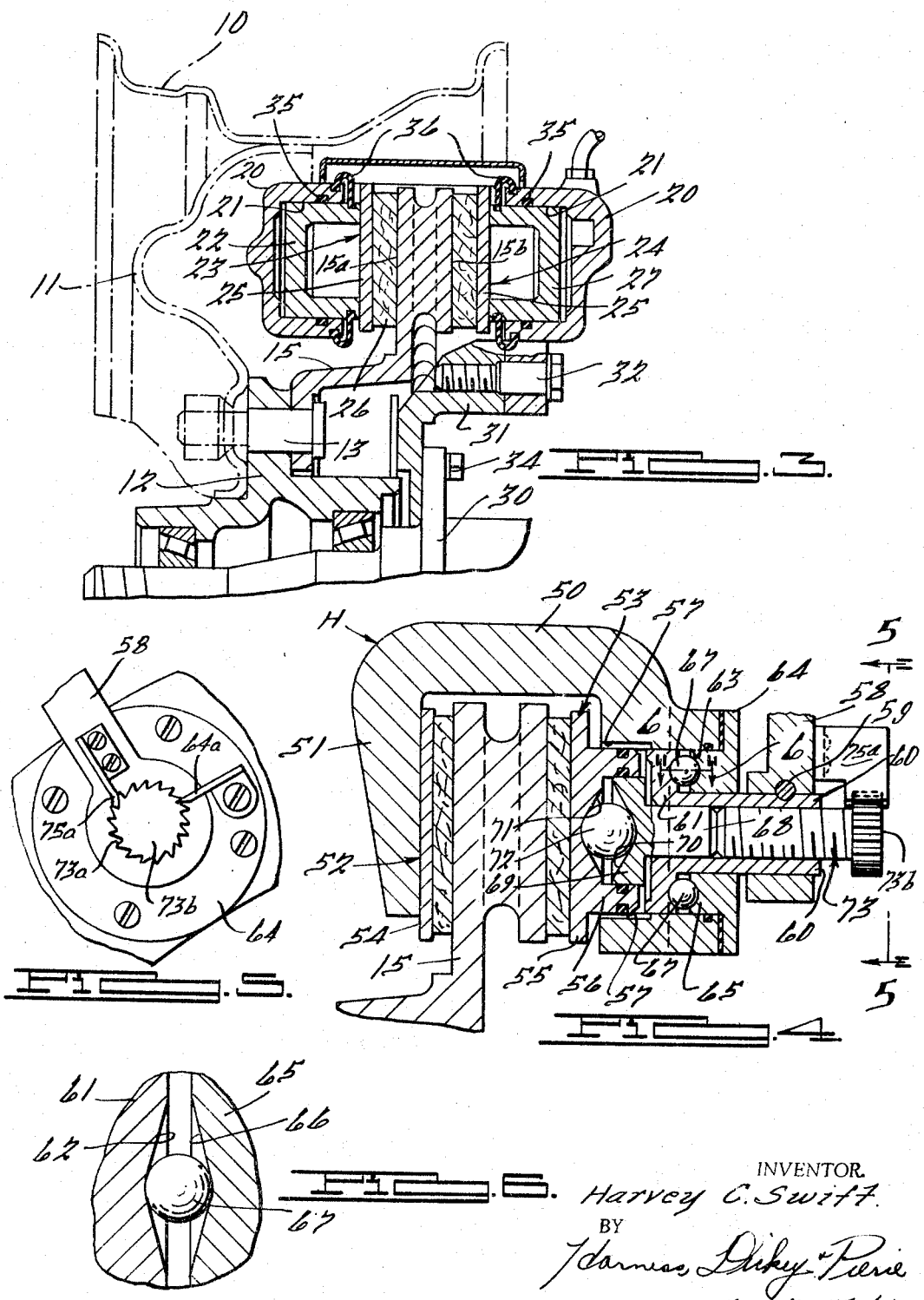

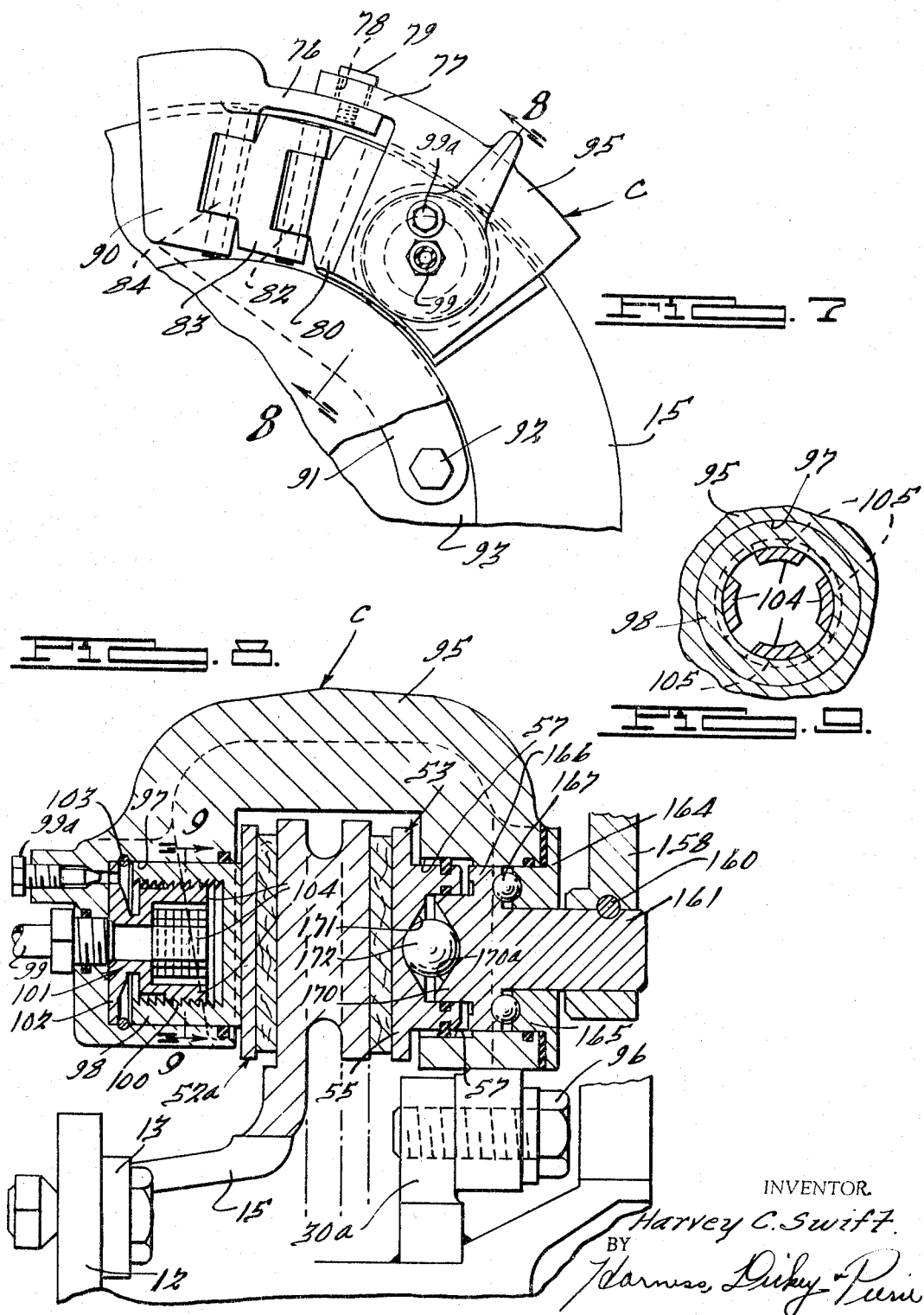

3,321,049
MECHANICAL FLOATING HEAD BRAKE
Harvey C. Swift, Birmingham, Mich., assignor to Kelsey-Hayes Company, Romulus, Mich., a corporation of Michigan
Filed May 12, 1965, Ser. No. 455,279
1 Claim. (Cl. 188—73)

This invention relates to disk type brakes for vehicle wheels and, more particularly, to a mechanical floating head type brake for use with brakes of this type, usually as an emergency or parking brake.

One of the objects of this invention is to provide a mechanical brake of this type which is self-energizing and thus is more efficient than conventional types of mechanical brakes.

Another object of the invention is to provide an emergency brake in which the braking force is applied to the brake disk by brake shoes of the disk brake type.

Another object of the invention is to provide an emergency brake of this type which may be readily associated with the caliper of conventional hydraulically operated disk brakes.

Still another object is to provide a brake of this type with a floating caliper or housing in which the brake shoes are mounted for manually applying pressure to one of said brake shoes and through the reaction of the caliper to apply braking pressure to the opposite brake shoe.

A further object of this invention is to anchor the brake shoes to a stationary part or member by means of angularly disposed converging links so that movement of the brake shoes during application of the brakes, while the vehicle is moving in a forward direction, will cause a wedging movement of the brake shoes toward the brake disk, thus resulting in an effective self-energizing action.

Another object of the invention is to provide a combined hydraulically actuated brake and a mechanically operated brake which may conveniently be combined into one compact unit.

Therefore, it is an object of this invention to provide a hydraulically operated disk brake having a mechanically operated parking or emergency brake combined therewith in such a manner that each brake actuating mechanism may be operated independently of the other and wherein the combined brakes and actuating means therefor are consolidated and assembled into a unit which may be economically manufactured, quickly and easily assembled and installed, and in which maintenance costs are reduced to a minimum.

The various objects and advantages, and the novel details of construction of two commercially practical embodiments of the invention, will become more apparent as this description proceeds, especially when considered in connection with the accompanying drawings, in which:

FIGURE 1 is an elevated view of a brake constructed in accordance with this invention, with the wheel removed;

FIGURE 2 is a top plan view of a portion of FIGURE 1 looking in the direction of arrow A;

FIGURE 3 is a fragmentary sectional view taken substantially on the plane indicated by line 3—3 in FIGURE 1;

FIGURE 4 is a fragmentary sectional view taken substantially on the plane indicated by line 4—4 in FIGURE 1;

FIGURE 5 is a fragmental view on line 5—5 of FIGURE 4;

FIGURE 6 is a detail view taken on line 6—6 in FIGURE 4;

FIGURE 7 is a view similar to FIGURE 1 of a modified form of construction;

FIGURE 8 is a fragmentary sectional view taken substantially on the plane indicated by line 8—8 in FIGURE 7; and FIGURE 9 is a detail section on line 9—9 of FIGURE 7.

The brake of this invention is shown as being associated with a vehicle wheel having a rim 10 and a wheel body 11 secured to the axle flange 12 by means of studs or bolt and nut assemblies 13.

In FIGURES 1 and 2, a manually or mechanically operated hand brake H is shown as being associated with a substantially conventional caliper type hydraulically operated brake B. The essentials of the caliper type hydraulic brake B will first be described, although this part of the brake construction forms no part of the present invention.

Secured to the axle flange 12 (see FIGURE 3), as for instance by means of the same stud or bolt and nut assemblies 13, in a brake disk 15. In the form of the invention illustrated, the brake disk is formed with a pair of spaced walls 15a and 15b.

Enclosing a part only of the braking surface of the brake disk 15 is a caliper-like member 20 in the form of a housing or yoke member. As will be seen from FIGURE 3, the sides of the yoke member are spaced on opposite sides of the disk 15 and are shaped to provide opposed cylinders 21 in which the brake shoe operating pistons 22 are disposed. These pistons engage brake shoes 23 and 24, each of which is provided with a backing plate 25 having a friction lining 26. Each backing plate 25, see FIGURE 1, is formed with a pair of ears 27 which engage ledges 28 on the caliper or housing 20 to slidably support the brake shoes.

The caliper member or housing 20 is mounted on a fixed part 30 of the axle structure by means of a torque member 31 to which the housing 20 is attached by bolts 32. The torque member 31 is connected to the axle part 30 by means of bolts 34.

Each piston 22 is provided with an annular seal 35 which restricts free movement of the piston and also seals the periphery thereof. Also, a flexible annular boot 36, formed of rubber, canvas, or any other suitable flexible material, may be provided to close the clearance between the pistons 22 and the cylinders 21 to exclude therefrom dust or other foreign material.

Fluid may be introduced into the cylinders 21 behind the pistons 22 by means of a fluid pressure inlet 40. The reference character 41 indicates one or more conduits connecting the cylinders 21 on one side of the device with the cylinders on the other side so that fluid may simultaneously be admitted to both sets of cylinders. Also, the cylinders are connected by an interior conduit 42 to a bleed opening 43 whereby the system may be freed from trapped air.

While one particular form of hydraulically operated brake has been illustrated and described, it will be apparent as this description proceeds that any desired or preferred type of hydraulic brake may be employed and associated with the manually or mechanically operated hand brake H.

The subject matter of the present invention consists in providing a mechanical floating head type brake which is self-energizing.

As shown in FIGURES 1, 2 and 4, the mechanically operated hand brake comprises a floating head consisting of a caliper-like member 50 straddling a portion of the brake disk 15. One leg 51 of the caliper-like member 50 engages brake shoe 52 to actuate this brake shoe through the reaction of the caliper-like member when the other brake shoe is manually operated. The manually operated brake shoe is indicated by the reference character 53. The brake shoe 52 is provided with a backing plate 54 of substantially conventional construction and the brake shoe 53 is provided with a backing plate 55. The backing plate 55 is provided with an annular flange or extension 56 which extends into an annular recess 57 formed in the caliper-like member 50. Thus, the brake shoe 53, as well as the brake shoe 52, is capable of movement in a torque direction when the brakes are applied.

While any suitable or preferred mechanical means may be provided for actuating the brake shoe 53, there is shown a brake actuating lever 58 which is fixed by a key 59 to a sleeve member 60. The sleeve member 60 is provided at one end with an outwardly extending flange 61 which is provided with a shallow tapered or dish-shaped recess 62 (see FIGURE 5) constituting part of the cam means for operating brake shoe 53. The caliper member 50 is provided with a bore 63 which is closed by a plate member 64 provided with an extension 65, the end face of which confronts the flange 61. This confronting face is also provided with a shallow tapered or dish-shaped recess 66; see FIGURE 5. One or more balls 67 are disposed in the space defined by the combined recesses 62 and 66, so that upon relative rotation of the sleeve member 60, a thrust to the left will be imparted to the sleeve member to actuate the brake shoe 53. When the brake shoe 53 is actuated, the caliper-like member 50 moves, by reaction, to the right, as viewed in FIGURE 4, to apply braking pressure to the brake shoe 52.

The thrust of the sleeve member 60 is imparted to the brake shoe 53 through a stud or plug member 68 which is engaged with the bore of the sleeve member 60. This stud or plug member is provided with a head 69 provided with a shallow tapered or dish-shaped recess 70 and the confronting face of the backing plate 55 of the brake shoe 53 is provided with a similar recess 71. A ball 72 is interposed between the surfaces of the recesses 70 and 71 so that the thrust on the brake shoe 53 is imparted through the ball 72. This permits the brake shoe 53 to shift in a torque direction to the extent allowed by the annular recess 57. A threaded pin 73 threaded into the sleeve member 60 may be provided to automatically adjust the plug member 68 to initially take up any clearance between the ball 72 and the surfaces of the recesses 70 and 71 and to further adjust the position of these parts, if and when it becomes necessary due to wear thereon.

As illustrated in FIGURES 1 and 2, the adjacent end of the caliper-like member 20 is provided with an extension 75 provided with an ear or lug 76 for connection to the caliper member 50 of the mechanically operated hand brake H. To accomplish this connection, the caliper 50 of the hand brake is provided with an ear or extension 77 provided with a slot 78; see FIGURE 2. A bolt 79 extends through the slot 78 and is threaded into an ear or extension 76 carried by the extension 75 of the caliper-like member 20. This allows a floating movement of the caliper 50 so that when the brake shoe 53 is actuated to apply the brakes, the described reaction of the caliper 50 is permitted so that the leg 51 may apply braking pressure to the brake shoe 52.

In order to make the hand brake self-energizing, the backing plates 54 and 55 of the brake shoes are provided with extensions 80 and 81, respectively, as shown best in FIGURE 2. The extension 80 is pivotally connected as at 82 to the inner end of a link 83 pivotally connected as at 84 to the extension 75 of the caliper-like member 20. In a like manner, the extension 81 is pivotally connected as at 85 to the inner end of a link 86 pivotally connected as at 87 to the caliper extension 75.

As will be seen from FIGURE 2, these links 83 and 86 are angularly disposed with respect to one another and diverge from the pivots 82 and 85 to the pivots 84 and 87. During the forward movement of the vehicle, the brake disk 15 is rotating in the direction of arrow A, FIGURE 2. The torque movement imparted to the brake shoes 52 and 53 causes the pivots 82 and 85 to move to the left, as viewed in FIGURE 2, and due to the diverging angular arrangement of the links 83 and 86, a wedging action results which acts to force the brake shoes into firmer engagement with the brake disk 15. During this movement, the pivots 82 and 85 tend to move toward the brake disk 15 in the direction of the arrows B in FIGURE 2. This renders the brakes self-energizing, as will be apparent.

In order to automatically adjust the brake shoes when the hand brake is applied, the threaded pin 73 is adjusted to adjust a plug member when the brake actuating lever 58 is actuated. This means comprises a dog or pawl 75a secured to the lever 58 adapted to engage an abutment type tooth 73a on the head 73b of the pin 73. Thus, when the lever 58 is actuated, the pawl 75a will engage one of said teeth 73a tending to rotate the pin 73. If the pin 73 is rotated one tooth space, a tooth 73a clears a stop member 64a secured to the plate member 64 to hold the pin 73 in its adjusted position to take up any clearance on the head 69 and the space between the surfaces 70 and 71 and the ball 72 due to wear on the brake linings.

In FIGURES 7, 8 and 9, a modification is illustrated in which the conventional hydraulically operated caliper type brake B is eliminated and a combined hydraulically and manually operated brake device C is employed. This device C is connected by links similar to links 83 and 86 to an anchor member 90 which straddles the brake disk 15 and is secured by a bracket 91 and a bolt 92 to a stationary part 93 of the axle and hub structure of the wheel. Also, the links 83 and 86 function in the same manner as previously described to render the brake self-energizing.

As shown in FIGURE 8, a hydraulic brake actuating means is combined with the manually operated means and so constructed that the combined hydraulically actuated brake and the mechanically actuated brake may be associated into one compact unit.

In this modified construction, a caliper member 95 is secured to a fixed part 30a of the axle structure by bolts 96. In this form of consrtuction, the caliper member 95 opposite the mechanical brake operating means, is formed with a cylinder 97 adapted to slidably receive a brake shoe operating piston 98 which engages the adjacent brake shoe 52a. The cylinder 97 is connected by a fluid pressure conduit 99 to a source of fluid under pressure so as to actuate the piston 98. The reference character 99a indicates a bleed opening. The piston 98 is hollow and its inner wall is provided with a plurality of abutment-type threads or teeth 100. Secured within the cylinder 97 is a collet or substantially sleeve-like member 101 which extends into the interior of the piston 98. The collet is provided with a head 102 with which a snap ring 103 engages to secure the collet in place. As shown in FIGURE 9, the collet is formed with a plurality of axially extending, circumferentially spaced arms 104, each of which is provided with matching threads or teeth 105 which are adapted to engage the threads or teeth 100 on the piston 98. If the brake lining on brake shoe 52a has become worn sufficiently so that the piston 98 moves more than one tooth space relative to the fixed collet 101, the teeth on the piston engage the next tooth space on the collet arms 104 and will be held in this new position to compensate for the wear on the brake shoe. As the piston moves in applying the brakes, the arms 104 are forced radially inwardly so that the interengaging teeth may clear one another.

In this modified form of construction, the brake shoes 52a and 53, FIGURE 8, are provided with extensions (not shown) similar to the extensions 80 and 81 (FIGURE 2) which are connected by links similar to links 83 and 86 to the anchor member 90. The torque movement imparted to the brake shoes 52a and 53 causes a movement of the links toward one another resulting in a wedging action which acts to force the brake shoes into firmer engagement with the brake disk to render the brake self-energizing in the manner previously described.

The application of the brakes by either the mechanical means or the hydraulic means actuates the adjacent brake shoe and through the reaction of the caliper-like member 95 actuates the other brake shoe.

The means for mechanically actuating the brake includes a lever 158 which is secured by a pin 160 to a plug-like member 161 rotatably mounted in the plate member 164. The plate member 164 is provided with an extension 165, the end face of which confronts the front face of a flange 166 on the plug. These confronting faces are provided with cam recesses in which balls 167 are disposed. Therefore, relative rotation of the plug member 161 and the plate member 164 imparts a thrust to the left to actuate the brake shoe 53. The plug-like member 161 is provided with a head 170 provided with a cam recess 170a and the confronting face 55 of the backing plate of brake shoe 53 is provided with a similar recess 171. A ball 172 is interposed between the surfaces of the recesses 170a and 171 so that the thrust on the brake shoe 53 is imparted through the ball 172. This permits the brake shoe 53 to shift in a torque direction to the extent allowed by the annular recess 57.

From the foregoing, it will be apparent that there is provided a self-energizing, manually operated mechanical brake which may be used as an emergency or parking brake. This brake unit may be associated with the conventional type hydraulically operated caliper brake, or it may be combined as a unit with a hydraulically actuated brake, as shown best in FIGURE 7.

The objects and advantages of the invention are accomplished by constructions which are so reduced in the number and character of their component parts as to approach the ultimate in structural simplicity to thereby create an economy in the manufacture, installation and maintenance costs of the brake.

While two commercially practical embodiments of the invention have been described and illustrated herein somewhat in detail, it will be understood that various changes may be made as may come within the purview of the accompanying claim.

What is claimed is:

In a mechanical floating head type brake for wheels having a brake disk rotatable with the wheel and a fixed support, that improvement which comprises a caliper-like member straddling a portion of the brake disk, means supporting said caliper on the fixed support for axial movement relative to the brake disk, a pair of pivoted links pivotally connected to the fixed support on opposite sides of the disk and projecting in a generally circumferential direction, a pair of brake shoes, each of said brake shoes being supported by one of said links within said caliper, actuating means carried by said caliper for directly motivating one of said shoes against the disk and through reaction on said caliper producing movement of the other brake shoe against the disk, and automatically adjustable means between said caliper and said actuating means for taking up clearance between said brake shoes and the disk, said brake shoes being unconnected to the caliper and said actuating means to permit said caliper and actuating means to engage said shoes in varying locations depending upon the wear of said shoes.

References Cited by the Examiner

UNITED STATES PATENTS

| 2,736,396 | 2/1956 | Rasmussen et al. | 188—196 |
| 2,820,530 | 1/1958 | Chouings et al. | 188—196 X |
| 2,901,059 | 8/1959 | Stacy | 188—73 |
| 2,946,408 | 7/1960 | Peras | 188—73 |
| 3,155,195 | 11/1964 | Brawerman | 188—73 |
| 3,169,608 | 2/1965 | Press et al. | 188—196 X |
| 3,207,267 | 9/1965 | Beuchle et al. | 188—73 |
| 3,243,016 | 3/1966 | Swift | 188—73 |

FOREIGN PATENTS

| 616,746 | 3/1961 | Canada. |
| 1,279,344 | 11/1961 | France. |
| 1,002,208 | 2/1957 | Germany. |
| 806,919 | 1/1959 | Great Britain. |
| 962,425 | 7/1964 | Great Britain. |

MILTON BUCHLER, *Primary Examiner.*

G. E. HALVOSA, *Assistant Examiner.*